United States Patent

Zaiser et al.

Patent Number: 5,467,667
Date of Patent: Nov. 21, 1995

[54] EPICYCLIC CHANGE-SPEED GEARBOX CASING WITH A SPIRAL PARTITION WALL

[75] Inventors: Wolfgang Zaiser, Steinheim; Hans Merkle, Stuttgart, both of Germany

[73] Assignee: Mercedes-Benz AG, Germany

[21] Appl. No.: 154,360

[22] Filed: Nov. 18, 1993

[30] Foreign Application Priority Data

Nov. 18, 1992 [DE] Germany ............... 42 38 855.4

[51] Int. Cl.⁶ .................................... F16H 57/04
[52] U.S. Cl. ........................... 74/606 R; 184/13.1
[58] Field of Search ............ 74/606 R; 184/11.2, 184/6.12, 13.1, 80, 82

[56] References Cited

U.S. PATENT DOCUMENTS

| | | | |
|---|---|---|---|
| 3,625,310 | 12/1971 | Herrick | 184/13.1 X |
| 3,703,107 | 11/1972 | Piret | 74/606 R X |
| 4,630,711 | 12/1986 | Levrai et al. | |
| 4,879,921 | 11/1989 | Asada et al. | 184/6.12 X |

FOREIGN PATENT DOCUMENTS

| | | |
|---|---|---|
| 2937501 | 3/1980 | Germany. |
| 3021162 | 12/1980 | Germany. |
| 3316117 | 11/1983 | Germany. |
| 3806996 | 9/1988 | Germany. |
| 1291257 | 10/1972 | United Kingdom. |
| 2032541 | 5/1980 | United Kingdom. |
| 2059521 | 4/1981 | United Kingdom. |
| 2147064 | 5/1985 | United Kingdom ............ 74/606 R |

Primary Examiner—Charles A. Marmor
Assistant Examiner—Mary Ann Battista
Attorney, Agent, or Firm—Evenson, McKeown, Edwards & Lenahan

[57] ABSTRACT

In a gearbox casing for an epicyclic change-speed gearbox, a region of the casing interior accommodating the rotating gearbox parts is partitioned off by a casing inner part configured as an intermediate wall from a region of the casing interior enclosed by a base part open towards the bottom in the installed position. The wall surface containing the inner mouth lays on a casing bulge which is bounded opposite the casing interior. The inner wall surface starts from a point on the cylindrical inner wall of the cylindrical casing outer part lying ahead of the mouth in relation to a forward rotation direction of the rotating gearbox parts to follow a spiral curve away from the casing longitudinal axis in a circumferential direction of the rotation axis.

17 Claims, 5 Drawing Sheets

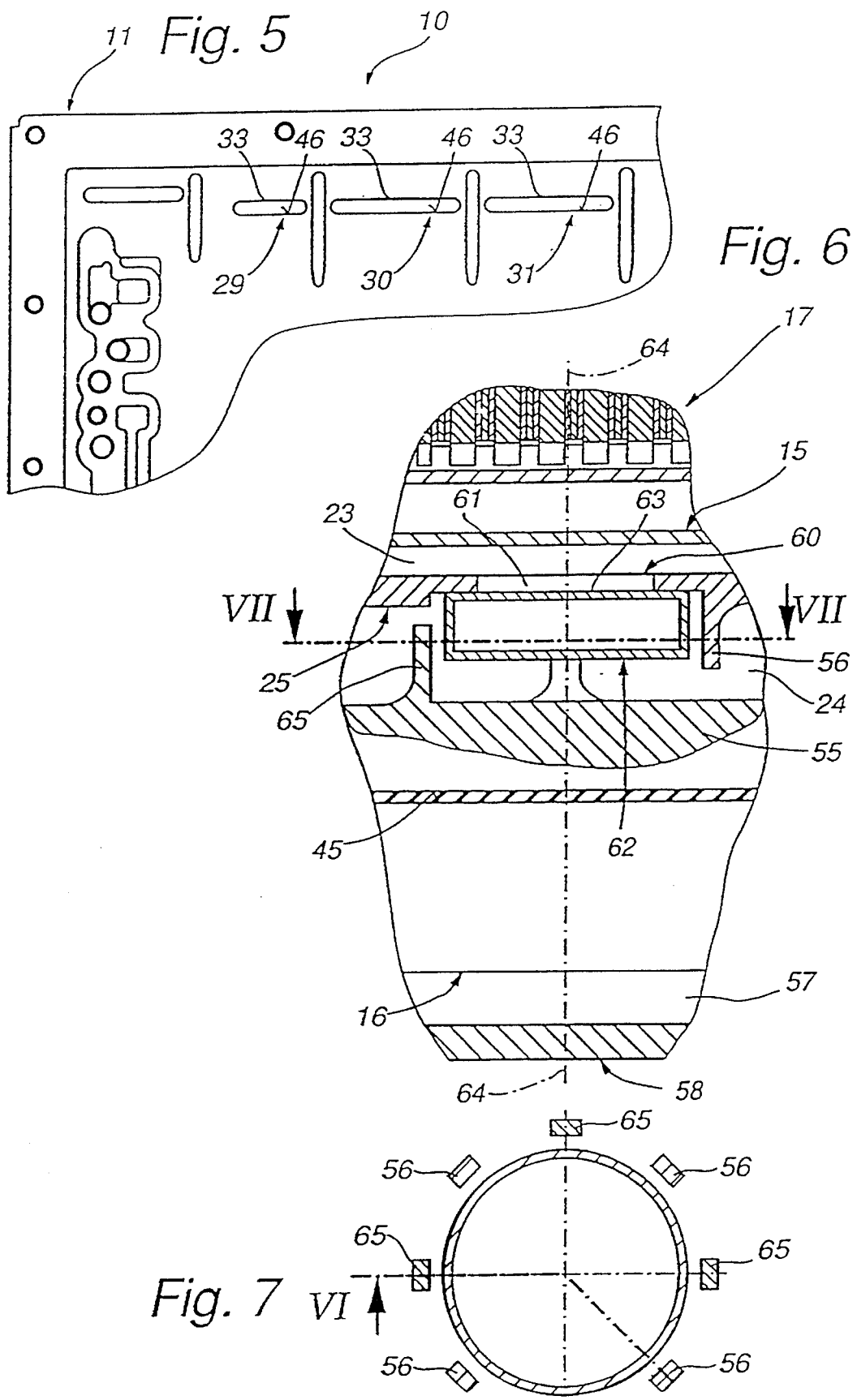

EPICYCLIC CHANGE-SPEED GEARBOX CASING WITH A SPIRAL PARTITION WALL

BACKGROUND AND SUMMARY OF THE INVENTION

The present invention relates to a gearbox casing, and more particularly, to a gearbox casing for an epicyclic change-speed gearbox, comprising two casing wall parts branching off upwards from a base part open towards the bottom in an installed position and arranged on both sides of a casing longitudinal axis coinciding with a central main axis of rotation of the rotating gearbox parts and extending in the directions of the casing longitudinal axis so as to enclose therebetween a casing interior accommodating rotating gearbox parts of the epicyclic change-speed gearbox and form a unitary cylindrical casing outer part, and a casing inner part is arranged in the casing interior in a rotationally fixed manner relative to the base part and extends partially between a lower portion of the outermost orbit of the rotating gearbox parts and one region of the casing interior enclosed by the base part. The casing inner part is configured as an intermediate wall extending from one of the two casing wall parts to the other of the two casing wall parts branching off upwards from the base part and to partition off another region of the casing interior which accommodates the rotating gearbox parts from the one region of the casing interior enclosed by the base part and is open towards the bottom, the casing inner part being cylindrical and lying centrally with respect to the casing longitudinal axis. The casing outer part and the casing inner part constitute a one-piece casing cylinder, and at least one outlet opening for lubricating oil is arranged to connect the another region of the casing interior which accommodates the rotating gearbox parts to the downwardly open region of the casing interior. One wall surface of the casing cylinder contains an inner mouth of the outlet opening, said mouth lying in the another region of the casing interior which accommodates the rotating gearbox parts.

DE 30 21 162 A1 discloses a gearbox casing in which two slot-shaped outlet openings extending in the circumferential direction of the main axis of rotation are provided in the cylindrical casing inner part used as an intermediate wall at a point which is at the smallest distance from the base end surface which closes off the base part at the bottom in the installed position, i.e. are situated in that section of the wall of the casing cylinder which is at the lowest point in the installed position. As a result, even when travelling at constant speed on the flat, oil can enter that region of the casing interior which accommodates the rotating gearbox parts, i.e. the casing cylinder, from the oil pan via the outlet openings situated at the bottom, especially when the oil heats up and its volume increases. DE 29 37 501 A1 discloses the installation of a gear train in the case of a gearbox casing of the type described in DE 30 21 162 A1.

DE 38 06 996 C2 discloses a gearbox casing which is to be installed transversely in the direction of travel of a motor vehicle. For the accommodation of a component belonging to a gearwheel set and rotating in an oil-lubricated support, the casing is provided with a casing intermediate wall which partially divides the space between the rotating component, the gearwheel set and the front casing outer wall into an annular segment-like space between the rotating component, the gearwheel set and the casing intermediate wall and into an oil return duct between the casing intermediate wall and the casing outer wall. The end of the casing intermediate wall which is at the top in the installed position of the gearbox casing defines the inlet opening of the oil return duct above the rotating component of the gearwheel set, and the lower end defines the outlet opening, open towards the oil pool, below the rotating component of the gearwheel set.

Given this special arrangement and configuration of the casing intermediate wall to create an oil return duct, the gearbox casing is said to have an excellent lubricant cooling capacity. The lubricant thrown off from the rotating component by centrifugal force due to its rotation is intended to be guided into the oil return duct at the inlet opening above the rotating component. The lubricant picked up by the rotating component, which is stirred up in the oil pool, is supposed to spray off due to the centrifugal force while it is being taken upwards by the rotating component. Consequently, the majority of the lubricant is guided from the inlet opening into the oil return duct. The lubricant introduced into this duct is supposed to flow in the latter towards the outlet opening and drip from the latter into the oil pool. The result of this is intended to be that the lubricant sprayed off by the rotating component is prevented from dripping onto the rotating component again before it returns to the oil pool. Because, furthermore, the oil return duct is arranged at the front end of the vehicle, the lubricant flowing through this duct is supposed to be cooled in an effective manner by the impinging relative wind.

An object on which the present invention is based is essentially to prevent lubricant from passing out of the oil sump, generally provided underneath the base part of the gearbox casing in the form of an oil pan, via the downwardly open gearbox casing to the rotating gearbox parts when the oil level rises, for example due to temperature effects, dynamic driving states or an oblique position of the vehicle.

The foregoing object has been achieved in an advantageous manner by the present invention, with a wall surface containing the inner mouth lying on a casing bulge which is bounded opposite the casing interior, by an inner wall surface, starting from a point on the cylindrical inner wall of the cylindrical casing outer part lying ahead of the mouth in relation to a forward rotation direction of the rotating gearbox parts to follow a spiral course away from the casing longitudinal axis in a circumferential direction of the central axis of rotation corresponding to the forward rotation direction.

In the above-described gearbox casing according to the present invention, the upper region of the casing interior, which upper region accommodates the rotating gearbox parts, is partitioned off from the lower region of the casing interior, which region generally accommodates shifting and control apparatus for the hydraulic shift actuators and is open towards the oil pool, with the result that oil cannot cross from the oil pool to the rotating gearbox parts.

In the gearbox casing according to the present invention, not only is a compact construction achieved but, in particular, it is also ensured that all the rotating gearbox parts accommodated in the upper region are partitioned off from the oil pool. Further, a circulating oil film consisting of the oil particles thrown off by the rotating gearbox parts is formed on the cylindrical casing inner wall, thereby preventing a large part of the oil used for lubrication from dripping back onto the rotating gearbox parts after flowing through the latter.

In the gearbox casing according to the present invention, the lubricating oil is fed to the lubrication points in a known manner via oil passages in the gearbox shafts. The lubricating oil is diverted into the oil pool after leaving the lubrication points via the oil outlets in the casing bulge.

Other advantageous arrangements and configurations of the outlet opening are adapted to the conditions of an oil film circulating on the cylindrical inner wall of the gearbox casing according to the present invention.

To avoid a situation, with the gearbox casing according to the invention, where the oil pump which is generally arranged in the oil pan mounted on the casing base part from below can suck in air because the oil level is too low, an oil level-safeguarding valve is provided and this can be arranged and controlled in an advantageous manner, for example, as a function of at least one operating parameter associated with the supply of pressure oil and lubricating oil.

BRIEF DESCRIPTION OF THE DRAWINGS

These and further objects, features and advantages of the present invention will become more readily apparent from the following detailed description thereof when taken in conjunction with the accompanying drawings wherein:

FIG. 5 is a view of the gearbox casing of FIG. 1 along the direction of arrow V in FIG. 2;

FIG. 6 shows another embodiment of the gearbox casing of FIGS. 1 to 5, but containing an oil level-safeguarding valve and being shown in a sectional representation along the line VI—VI in FIG. 7 corresponding to the detail X in FIG. 1;

FIG. 7 is a sectional view through the oil level-safeguarding valve along the line VII—VII in FIG. 6;

DETAILED DESCRIPTION OF THE DRAWINGS

Figure 1:
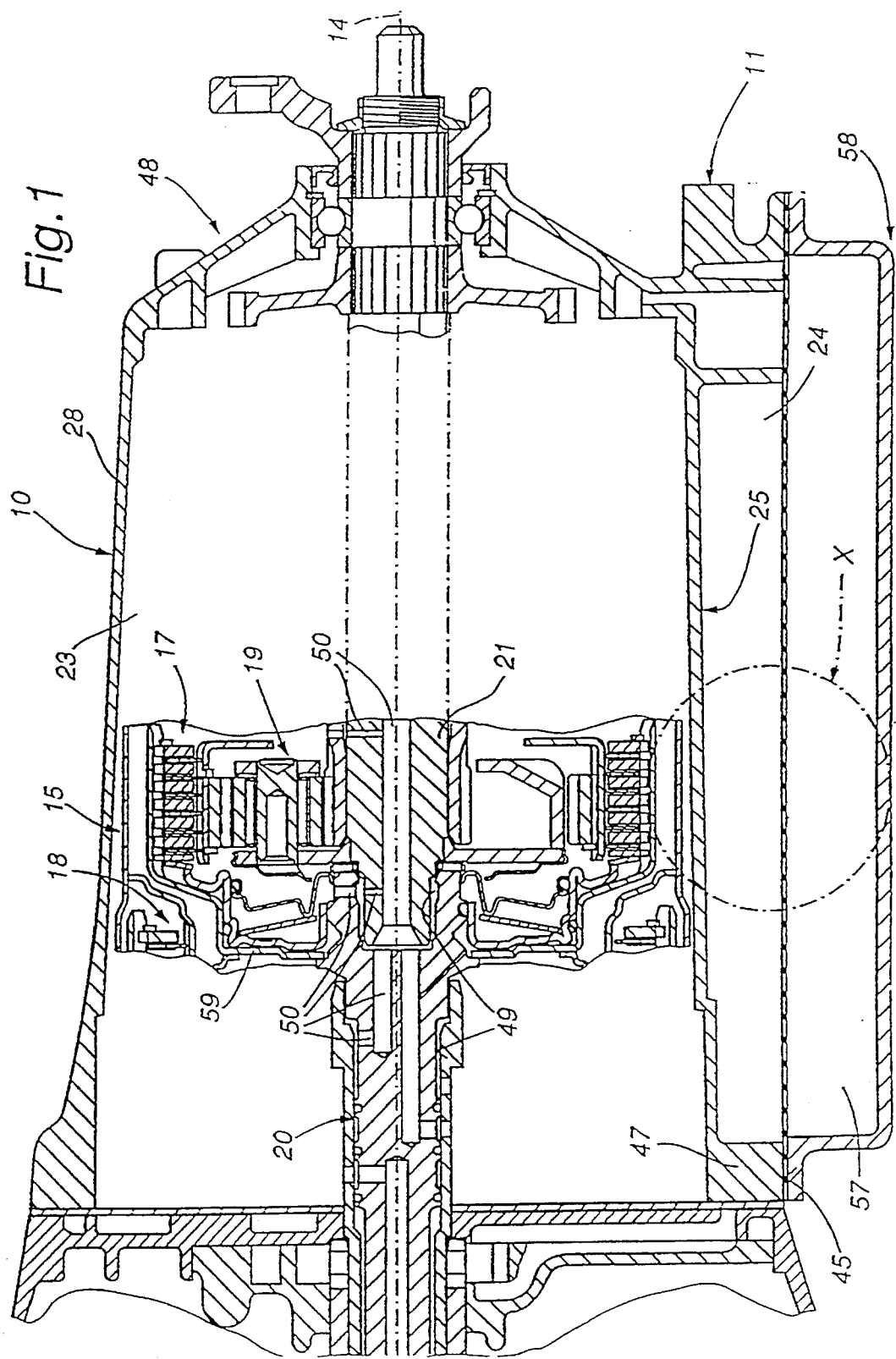
FIG. 1 is a partial sectional view through an epicyclic change-speed gearbox with a gearbox casing in accordance with the present invention, in a plane containing the central main axis of rotation of the planetary wheels.
Figure 2:
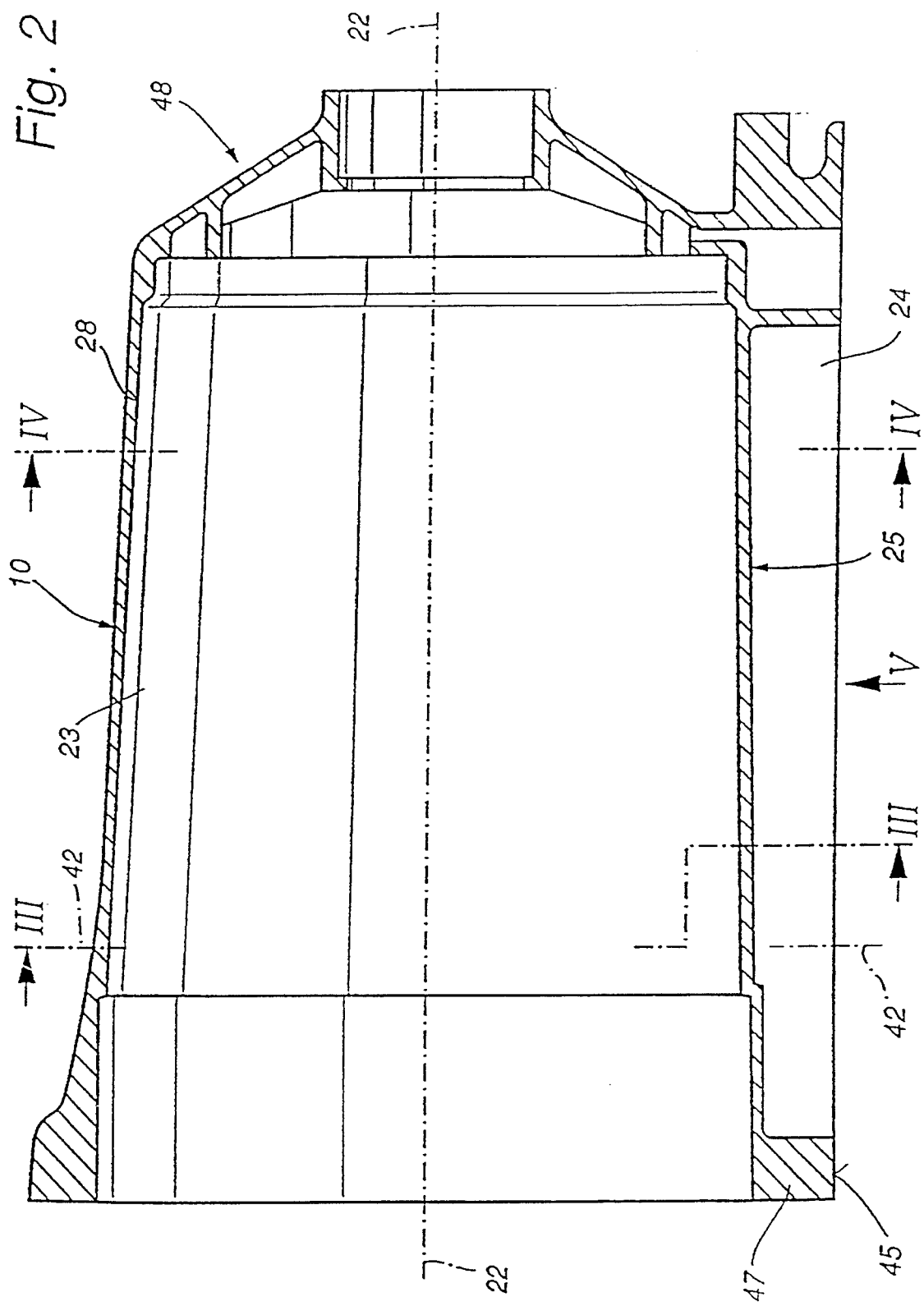
FIG. 2 is a cross-sectional, longitudinal view of the gearbox casing of FIG. 1 as a separate part.

Referring to FIGS. 1 to 5, a gearbox casing 10 of an epicyclic change-speed gearbox accommodates, among other things, gearbox part 18, an input shaft 20, a coaxial output shaft 21 and a single-web epicyclic gear train 19 in a conventional manner. The input shaft 20 is connected via a driving drum 59 and a multi-disc clutch 17 to the outer sun wheel of the epicyclic gear train 19. The output shaft 21 is connected to the planet carrier of the epicyclic gear train 19, and other gear elements are connected to one another via an outer driving drum 15 which has the radially outermost orbit 27 (FIG. 4) of the gearbox parts of the change-speed gearbox which rotate about the central main axis 14—14 of rotation.

The gearbox casing 10 has a center longitudinal plane 54—54 (FIG. 3) and a lower, box-shaped base part 11 with a flat, open lower base end surface 45 to which an oil pan 58, in which an oil pool 57 collects, is flanged on from below. Situated within the oil pan 58 is a control plate 16 which is flanged to the base end surface 45 from below and contains hydraulic valves for controlling and regulating the working pressure of the operation of the clutches and brakes of the change-speed gearbox. Further control parts are arranged on the upper side of the control plate 16 and project into a downwardly open region 24 of the gearbox casing and a housing of which is indicated at 55 in FIG. 6. The rotating gearbox parts as a whole, that is to say not just the previously mentioned gearbox parts 15 to 21, are mounted in an upper region 23 of the gearbox casing 10, which region is partitioned off from the region 24 open downwards towards the oil pool 57 by an intermediate wall 25.

In the directions of a casing longitudinal axis 22—22 coinciding with the central main axis 14—14 of rotation, the casing inner part 25 extends continuously from a connection flange 47, which forms one end of the gearbox casing 10, to an end wall 48 forming the other end of the gearbox casing 10. As is shown, in particular, in FIGS. 3 and 4, two casing wall parts 12 and 13, which are arranged on both sides of the casing longitudinal axis 22—22 and extend in the directions of the casing longitudinal axis 22—22, branch off upwards from the base part 11. These casing wall parts 12 and 13 are brought together to form a cylindrical casing outer part 28 which lies concentrically with respect to the casing longitudinal axis 22—22. The casing inner part 25 configured as an intermediate wall extends transversely to the casing longitudinal axis 22—22 between the two casing wall parts 12, 13 branching off upwards, with the result that the two regions 23 and 24 of the casing interior are partitioned off from one another over the entire length and the entire width of the gearbox casing 10.

Casing inner part 25 configured as an intermediate wall is cylindrical and aligned concentrically with the casing longitudinal axis 22—22. The contour of the casing inner part 25 is adapted to bring it as close as possible to the lower portion 26 of the outermost orbit 27 of the rotating gearbox parts 15 to 21.

Figure 3:
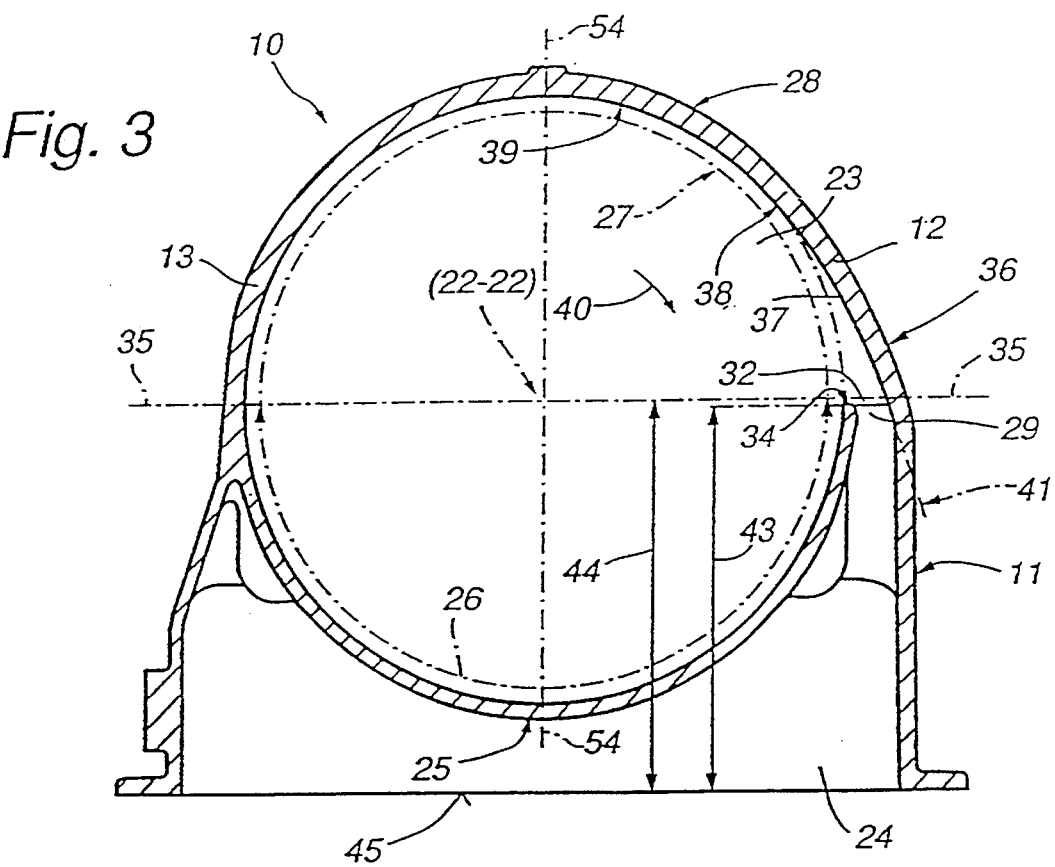
FIG. 3 is a cross-sectional view of the gearbox casing along line III—III in FIG. 2.
Figure 4:
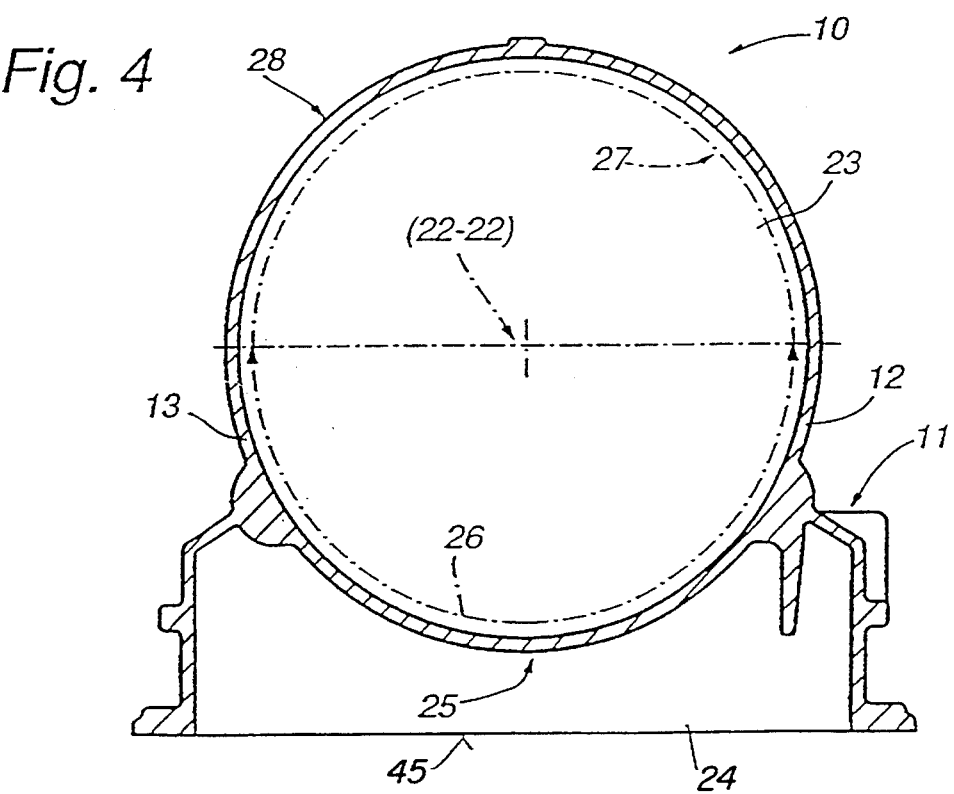
FIG. 4 is a cross-sectional view of the gearbox casing along the line IV—IV in FIG. 2.

Casing outer part 28 and casing inner part 25 are furthermore configured as a one-piece casing cylinder with cylindrical inner surface 39 on which, during operation, collects an oil film consisting of oil-splash droplets which circulate in the direction of the arrow 40 in FIG. 3 of the forward rotation of the rotating gearbox parts 15 to 21.

At a point as far as possible above the oil pool 57, the lubricating oil is diverted out of the region 23 through a casing bulge 36 (FIG. 3), via one or more outlet openings 29 to 31, using centrifugal force. For this purpose, the mouth 32 of the outlet opening 29 is situated in the region 23 at a distance 43 from the base end surface 45 (and hence at a corresponding distance from the oil pool 57) which is approximately equal to the distance 44 between the casing longitudinal axis 22—22 and the base end surface 45 as measured in the same casing transverse plane 42—42. The wall surface 34 containing the mouth 32 is arranged transversely to the circulating oil film, i.e. in a casing plane 35—35 containing the casing longitudinal axis 22—22 or in a close parallel plane, and the mouth 32 has the shape of a longitudinal slot 33.

In order to use the known effect of a spiral casing in the outlet of hydrodynamic machines, the casing bulge 36 has an inner wall surface 37 which starts from a point 38 on the cylindrical wall surface 39 lying upstream of the mouth 32 in respect of the circulating oil film. The wall surface 37 follows a path 41 (dot-dash line) which moves away in a spiral from the casing longitudinal axis 22—22, and the wall surface 37 ends in the wall surface 34 for the mouth 32. As a result, oil leaves the oil film circulating in the direction of arrow 40 and enters the housing bulge 36, where it is, as it were, skimmed off by the slot-shaped mouth 32, 33 and flows via the region 24 of the casing interior 23, 24 which is open downwards towards the oil pan 58 into the oil pool 57. The oil used for the lubrication is fed to the lubrication points in region 23 of the casing interior in a known manner via oil distribution grooves 49 and passages 50 in the gearbox shafts 20 and 21.

In the embodiment of FIGS. 6 and 7, the casing inner part 25 configured as an intermediate wall has a lower opening 61 at a point close to the base end surface 45. This opening 61 connects the two regions 23, 24, which are essentially partitioned off from one another, and can be closed by an oil level-safeguarding valve 60 when the oil level in the oil pan 58, and thus in the communicating lower region 24 of the casing interior, is sufficiently high, in particular in order to prevent the sucking in of air by an oil pump (not shown) with a suction mouth arranged in a known manner just above the bottom of the oil pan 58. A float 62 is arranged underneath the opening 61 and has an upper outer wall 63 used as a valve-closing member and interacting in the manner of a seat valve with the opening 61 used as the valve passage. The float 62 is guided in a manner which allows it to move in the direction of the axis 64—64 of the opening 61, as seen in FIG. 7, by four web-like projections 56, parallel to the axis 64—64, of the casing 55 and by four web-like projections 65, parallel to the axis, of the intermediate wall 25. These projections 56, 65 are arranged alternately and in a uniformly distributed manner around the axis 64—64.

In the drive selection-range position D, for example, the change-speed gearbox can be in a starting state, in which the rotary gear elements are braked fast and the oil pump is driven, so that oil is pumped to the lubrication points in region 23 of the casing interior but cannot reach the outlet openings 29 to 31, with the result that the oil level rises in the upper region 23 and falls in the oil pan 58. Under these circumstances, the oil level-safeguarding valve 60 opens, with the result that it is possible in this case for the lubricating oil to flow out of region 23 into the oil pool 57 via the opening 61.

Figure 8:
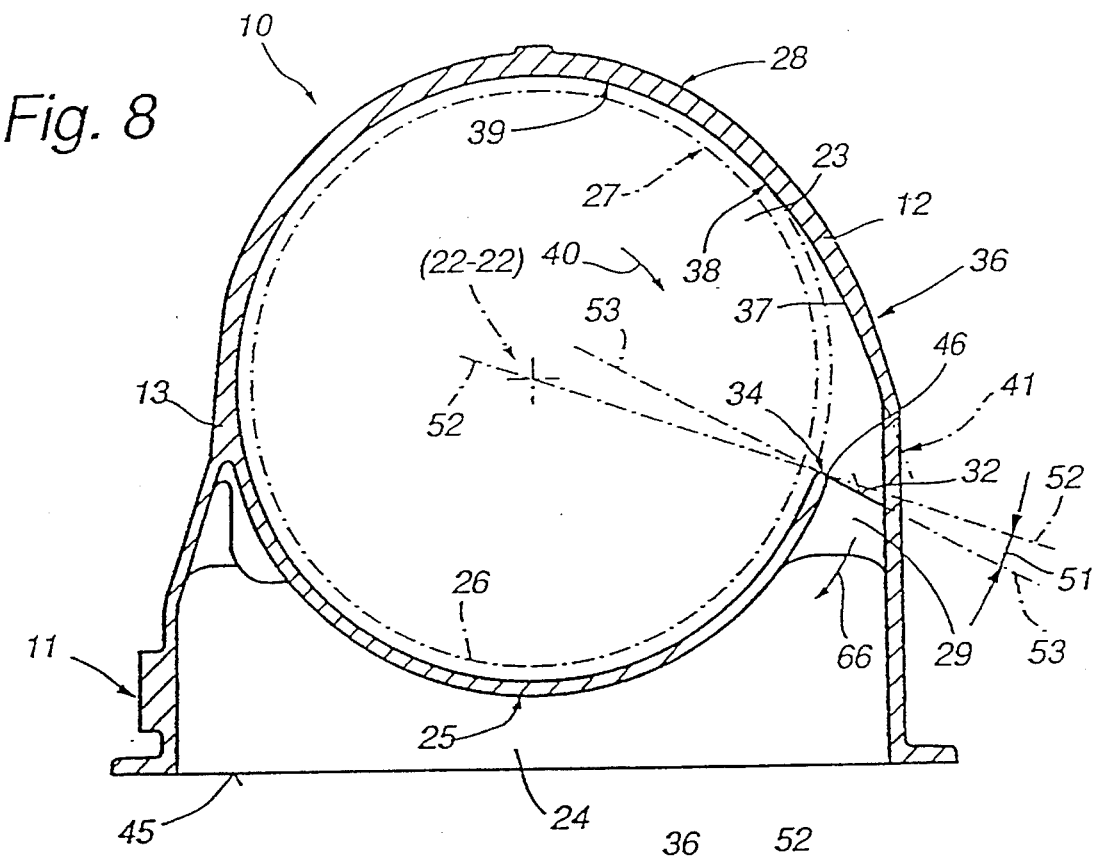
FIG. 8 is a cross-sectional view of another embodiment of the gearbox casing of FIGS. 1 to 5 similar to FIG. 3, but relating to a lower position of the outlet opening.
Figure 9:
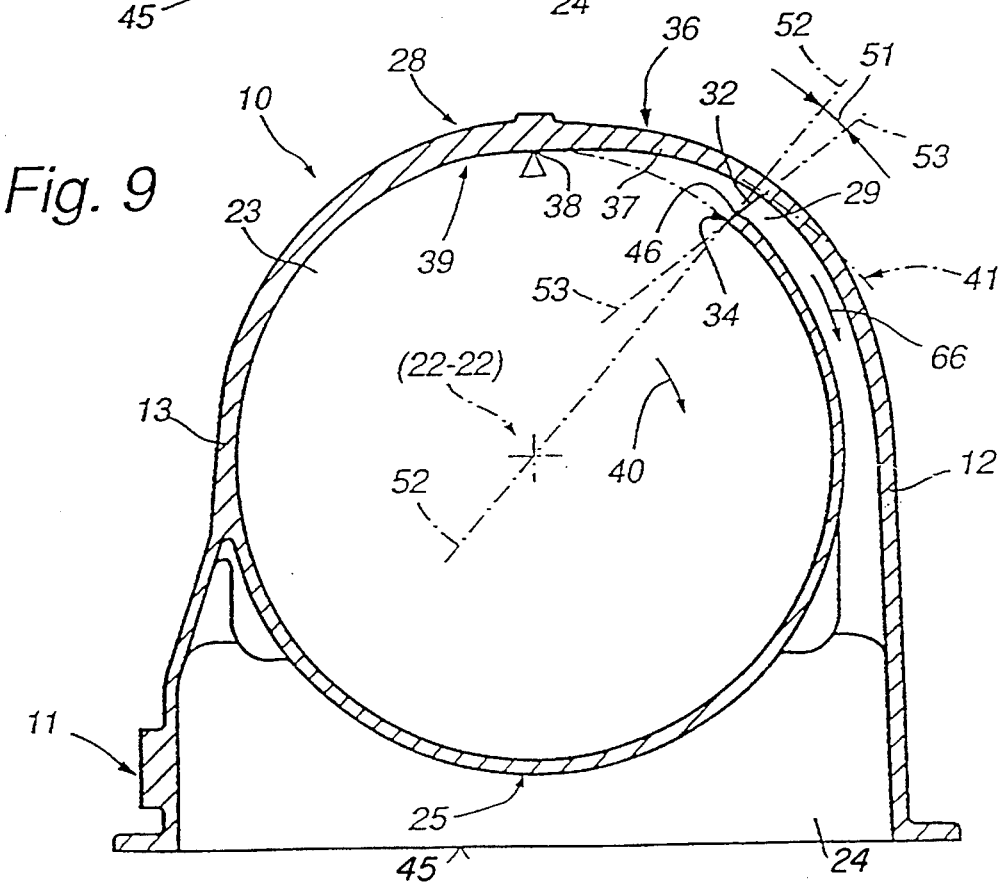
FIG. 9 is a cross-sectional view of yet another of the gearbox casing of FIGS. 1 to 5 similar to FIG. 3, but relating to a higher position of the outlet opening.

In the embodiments of FIGS. 8 and 9, those features which correspond to the embodiment of FIGS. 1–5 are provided with the same reference numerals so that reference thereto can be made by reference to the description of FIGS. 1 to 5. The distance between the mouth 32, which is situated in the region 23, of the outlet opening 29 and the base end surface 45 is considerably smaller in the embodiment of FIG. 8 than the distance between the casing longitudinal axis 22—22 and the base end surface 45.

The mouth 32 in the embodiment of FIG. 9 is considerably higher, i.e. at a considerably greater distance from the base end surface 45 than the casing longitudinal axis 22—22. Thus, the penetration of lubricating oil from the oil pool 57 into region 23 via the outlet opening 29 is reliably avoided.

Common to both the embodiments of FIGS. 8 and 9 as regards the mouth 32 of the outlet opening situated in region 23 is the fact that edge 46 of the mouth 32 which lies adjacent to the casing longitudinal axis 22—22 is arranged in a first casing plane 52—52 containing the casing longitudinal axis 22—22. The wall surface 34 of the casing cylinder 25, 28 in which the mouth 32 lies is arranged in a second casing plane 53—53 parallel to the casing longitudinal axis 22—22. The casing plane 53—53 is set at an acute setting angle 51 to casing plane 52—52 in the direction 66 of flow towards region 24, as seen from the mouth 32, and the vertex of the said angle lies in or near to the mouth edge 46. This ensures that the lubricant escaping into the casing bulge 36 is not forced back into region 23 at the mouth of the outlet opening 29.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A gearbox casing for an epicyclic change-speed gearbox, comprising two casing wall parts branching off upwards from a base part open towards a bottom thereof in an installed position and arranged on both sides of a casing longitudinal axis coinciding with a central main axis of rotation of rotating gearbox parts and extending in a direction of the casing longitudinal axis so as to enclose therebetween a casing interior accommodating the rotating gearbox parts of the epicyclic change-speed gearbox, in which the rotating gearbox parts define an outer rotating boundary, and forming a unitary cylindrical casing outer part, and a casing inner part arranged in the casing interior in a rotationally fixed manner relative to the base part and extending along a lower portion of the outer rotating boundary of the rotating gearbox parts, and one region of the casing interior enclosed by the base part said casing inner part being configured as an intermediate solid wall extending from one of the two casing wall parts toward the other of the two casing wall parts to partition off another region of the casing interior which accommodates the rotating gearbox parts from the one region of the casing interior enclosed by the base part and is open towards the bottom, the casing inner part being cylindrical and lying centrally with respect to the casing longitudinal axis, and the casing outer part and the casing inner part constituting a one-piece casing cylinder, and at least one outlet opening for lubricating oil arranged to connect the another region of the casing interior which accommodates the rotating gearbox parts to the one region of the casing interior and one wall surface of the casing cylinder contains an inner mouth of the at least one outlet opening, said inner mouth lying in the another region of the casing interior which accommodates the rotating gearbox parts at an upper free end of the casing inner part, wherein the wall surface containing the inner mouth is opposite a casing bulge defined by an inner wall surface which starts from a point on an inner wall of the cylindrical casing outer part lying ahead of the inner mouth in relation to a forward rotation direction of the rotating gearbox parts, and follows a spiral curve away from the casing longitudinal axis in a circumferential direction of the central main axis of rotation corresponding to the forward rotation direction.

2. The gearbox casing according to claim 1, wherein, in one direction of the casing longitudinal axis, the casing inner part merges into a connection flange situated at an end of the gearbox casing, partitioning off the another region of the casing interior which accommodates the rotating gearbox parts.

3. The gearbox casing according to claim 1, wherein, in another direction of the casing longitudinal axis, the casing inner part merges into an end wall situated at an end of the gearbox casing.

4. The gearbox casing according to claim 1, wherein a mouth edge is situated in a first casing plane passing through the casing longitudinal axis, a wall surface in which the inner mouth associated with the mouth edge lies is arranged in a second casing plane parallel to the casing longitudinal axis, and the second casing plane is set at an acute setting angle, to the first casing plane in a direction of flow of the lubricating oil towards a downwardly open region of the casing interior, and the vertex of the acute setting angle lies in or near to the mouth edge adjacent to the casing longitudinal axis.

5. The gearbox casing according to claim 1, wherein the at least one outlet opening is situated at the cylindrical casing outer part.

6. The gearbox casing according to claim 1, wherein the at least one outlet opening is situated at the casing inner part.

7. The gearbox casing according to claim 6, wherein the inner mouth lies in the another region of the casing interior which accommodates the rotating gearbox parts, and the wall surface containing the inner mouth of the at least one outlet opening, lies in a casing plane parallel to a casing plane containing the casing longitudinal axis.

8. The gearbox casing according to claim 6, wherein, with reference to a vertical casing longitudinal center plane containing the casing longitudinal axis and to a casing transverse plane perpendicular to the casing longitudinal center plane and intersecting the inner mouth of the at least one outlet opening, said inner mouth lies in the another region of the casing interior which accommodates the rotating gearbox parts, and with reference to a flat base end surface of the base part, which said base end surface lies perpendicular to the casing longitudinal center plane and one of parallel to or at a slight inclination to the casing longitudinal axis, said inner mouth of the at least one outlet opening and the casing longitudinal axis are at approximately the same distance from the base end surface.

9. The gearbox casing according to claim 6, wherein the wall surface containing the inner mouth of the at least one outlet opening, said inner mouth lying in the another region of the casing interior which accommodates the rotating gearbox parts, lies in a casing plane containing the casing longitudinal axis.

10. The gearbox casing according to claim 1, wherein at least two outlet openings are provided.

11. The gearbox casing according to claim 10, wherein the at least two outlet openings lie next to one another in the direction of the casing longitudinal axis.

12. The gearbox casing according to claim 1, wherein the inner mouth of the at least one outlet opening, said inner mouth lying in the another region of the casing interior which accommodates the rotating gearbox parts, has a slot-like configuration extending in the direction of the casing longitudinal axis.

13. The gearbox casing according to claim 1, wherein an oil level-safeguarding valve connects a downwardly open region of the casing interior to the another region of the casing interior accommodating the rotating gearbox parts.

14. The gearbox casing according to claim 13, wherein the oil level-safeguarding valve is operatively arranged at an opening in a lower portion of the casing inner part.

15. The gearbox casing according to claim 13, wherein means is provided for controlling the oil level-safeguarding valve as a function of at least one operating parameter associated with the supply of pressure oil and lubricating oil.

16. The gearbox casing according to claim 15, wherein the fluid level in one of a downwardly open region of the casing interior and an oil pan communicating with the downwardly open region is the at least one operating parameter.

17. The gearbox casing according to claim 16, wherein a float for controlling the oil level-safeguarding valve is operatively accommodated in the downwardly open region of the casing interior.

\* \* \* \* \*